Sept. 15, 1970  S. A. DASHEW ETAL  3,528,608
EXPANSION JOINT

Filed Sept. 9, 1968  4 Sheets-Sheet 1

INVENTORS
STANLEY A. DASHEW
LESTER G. JANZOW
BY
Lindenberg & Freilich
ATTORNEYS

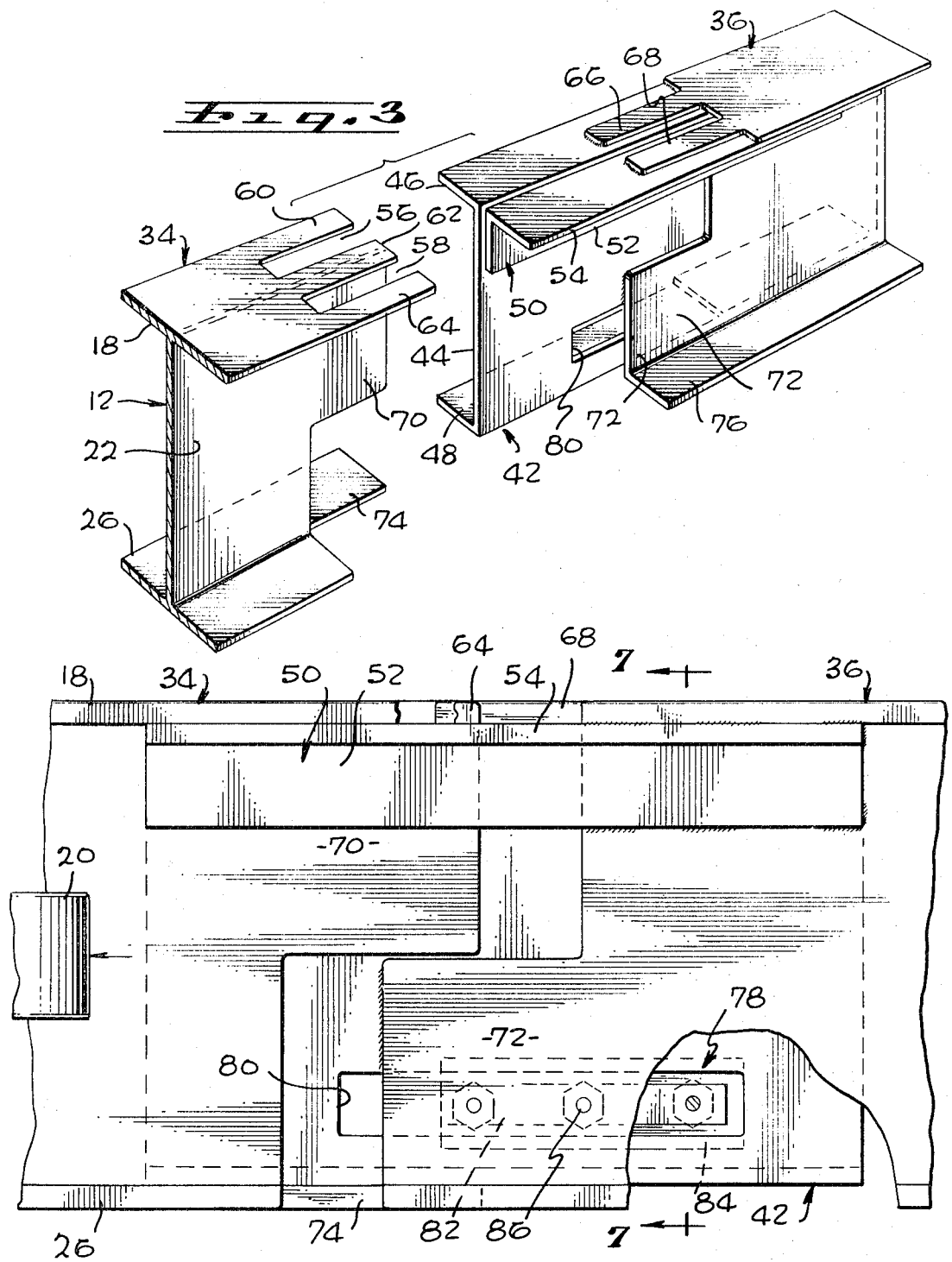

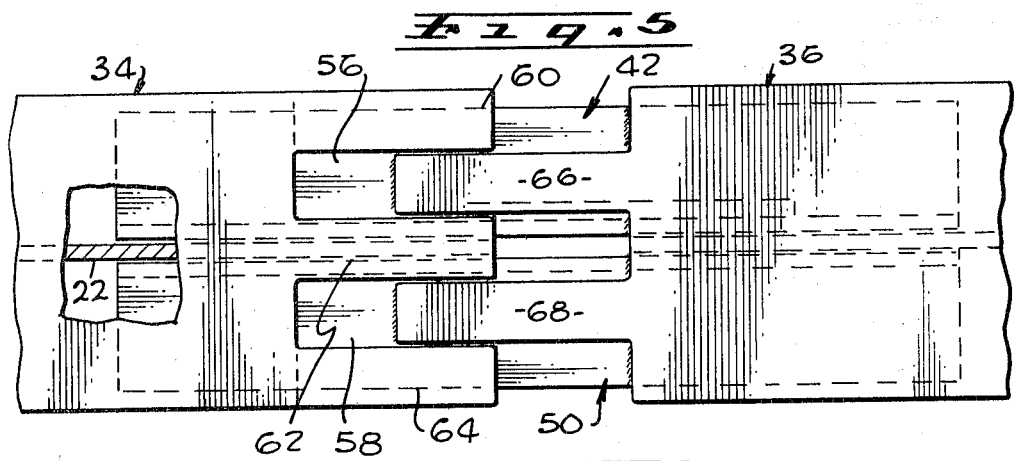
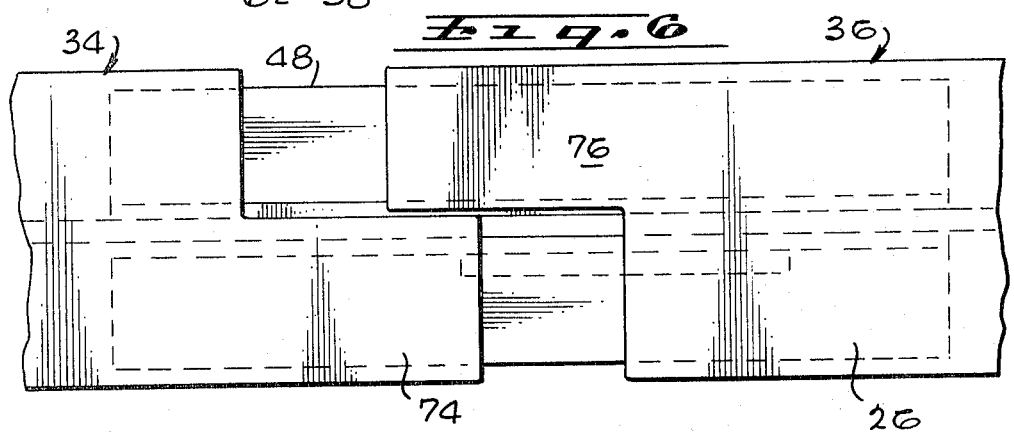
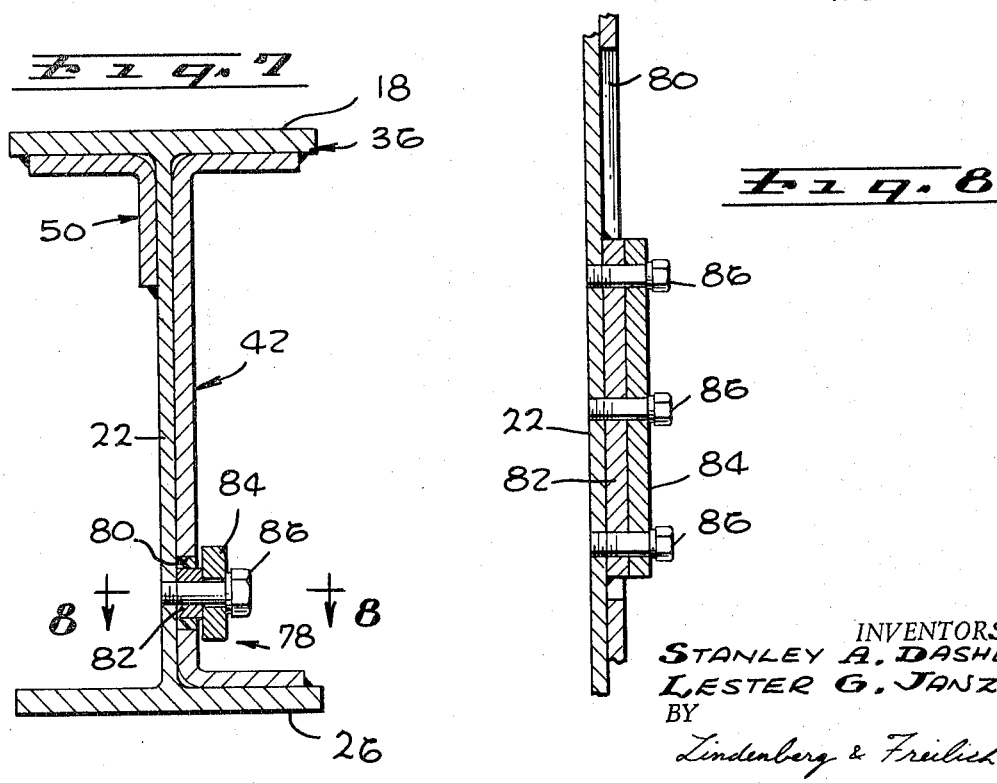

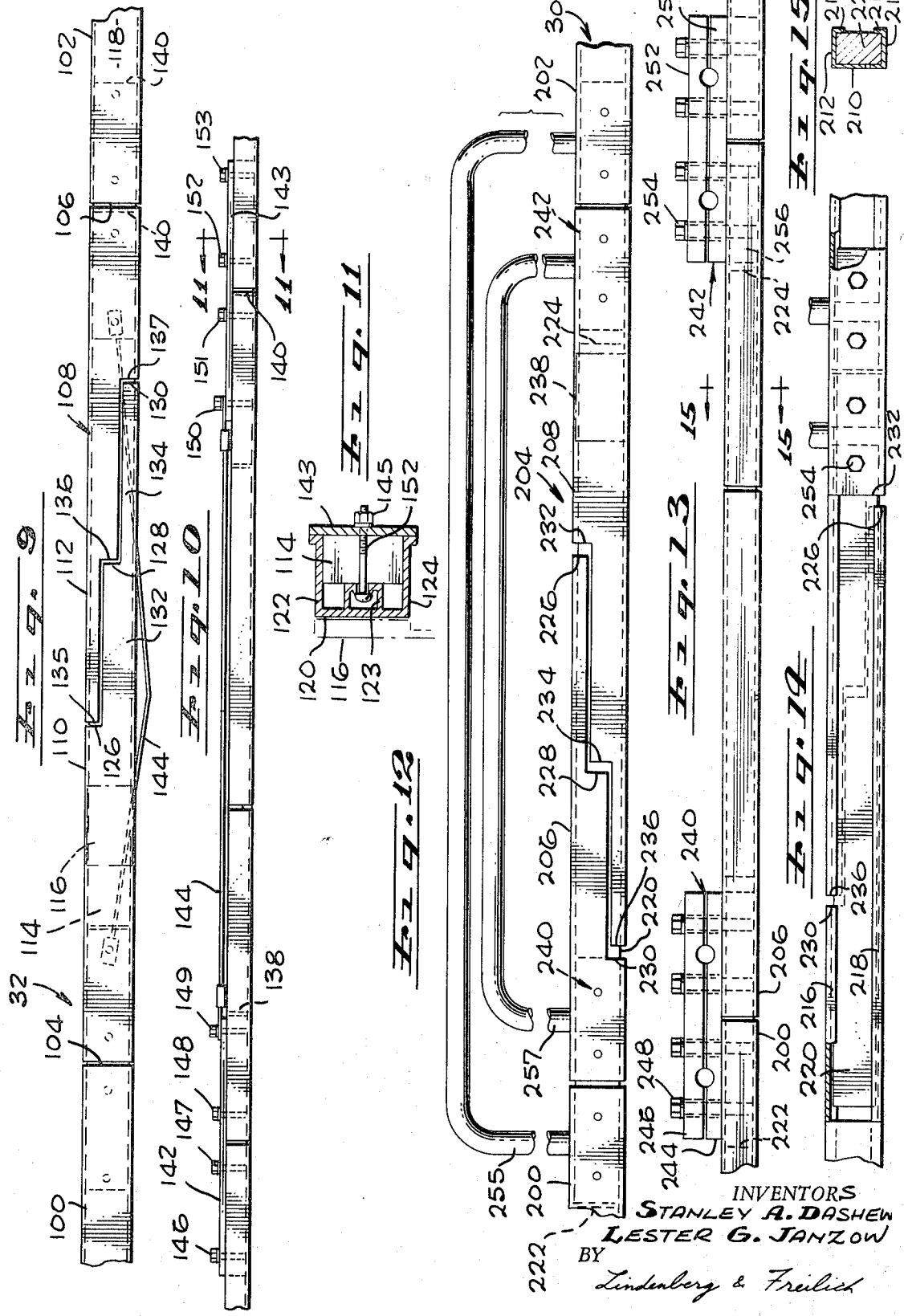

United States Patent Office 3,528,608
Patented Sept. 15, 1970

3,528,608
EXPANSION JOINT
Stanley A. Dashew, Santa Monica, and Lester G. Janzow, Los Angeles, Calif., assignors to The Dashaveyor Company, Venice, Calif., a corporation of California
Filed Sept. 9, 1968, Ser. No. 758,321
Int. Cl. E01b 11/02
U.S. Cl. 238—151     6 Claims

ABSTRACT OF THE DISCLOSURE

Expansion joint apparatus for use in vehicle supporting main tracks which are of I-beam cross section, and for use in auxiliary tracks that carry control signals and power. The expansion joints comprise cut-away portions and corresponding fingers or extending portions on connecting sections of track which enable them to fit into each other. The cut-away and finger portions generally lie on opposite sides of the center line of the path taken by wheels or other vehicle elements that contact the track.

BACKGROUND OF THE INVENTION

Field of the invention

This invention relates to track guided vehicle systems, and more particularly to expansion joints for the tracks thereof.

Description of the prior art

A new type of track-guided vehicle system has been developed wherein the vehicles run along elevated tracks of I-beam construction. The vehicles generally carry tires that roll along the upper I-beam flange, idler wheels that can contact the lower face of the bottom flange, and lateral guide wheels that contact the inner face of the web. Such a system permits smooth, high speed travel using an economical track layout. A more complete description of the system is given in the co-pending patent application entitled Railway Transportation System, by Dashew et al., Ser. No. 691,383, filed Dec. 18, 1967.

In the construction of track layouts for the foregoing system, provisions must be made for expansion and contraction due principally to changes in ambient temperature. In some track systems, simple gaps can be used between the ends of connecting track sections. However, this can cause large jolts as the vehicle passes over the gap. In addition, simple gaps would result in connecting track sections being out of alignment as a vehicle passed between them. This would result in large jolts which would prevent high speed travel and substantially increase wear. The connection of I-beam tracks to allow for large expansions and contractions is especially difficult because both flanges and the web carry vehicle wheels.

OBJECTS AND SUMMARY OF THE INVENTION

One object of the present invention is to provide an improved track expansion joint.

Another object is to provide a track expansion joint which assures a minimum of shocks to vehicles passing thereacross.

In accordance with the present invention, expansion joints are provided for reducing shocks in the passage of vehicles thereacross. Such joints are provided for main tracks of I-beam cross section, as well as for auxiliary tracks which carry power and control signals. In order to reduce the discontinuity between the connecting ends of track sections, the ends are formed with cutaway portions that fit into each other. The cutaway portions are generally located on either side of the center line of the path taken by the wheels or other vehicle elements that contact the track. As a result, the wheel or other element enters upon the new track section in two or more steps instead of one large step, thereby reducing the shock. In addition, the interfitting cut-away sections help maintain the connecting track ends at the same level, to further reduce shocks.

In one embodiment of the invention, an expansion joint is provided for an I-beam track which is used to carry wheels along the center of its top and bottom flanges and along an inner face of the web. In this expansion joint, the upper flange of one track section is cut away to form three fingers. These fingers fit into slots between two fingers formed in the upper flange of the other track section. During movement over the joint, the wheels which support the vehicle weight bear simultaneously on at least two fingers of each track section.

In the foregoing joint for an I-beam track, a channel beam is provided which connects the outer flange areas of the connecting track sections, in order to support the track section ends at the same level. In order to reduce the jolt on the wheels that ride along the inner web face and along the bottom flange, cut-away portions are provided at the web and bottom flange along the centers of the wheel paths. As a result, a wheel is always supported on at least half of its width during movement between connecting track sections.

In another embodiment of the invention, an expansion joint is provided for the electrical rails which run alongside the track layout. These rails, which are generally channel beams, carry power and signal currents, and are contacted by shoes on the vehicle that are spring biased towards the rails. In order to reduce jolts between rail sections, to reduce wear on the shoes, and to prevent small shoe-to-rail contact areas which might result in hot spots, cut-away portions are formed at the ends of the rails, the cut-away portions fitting into each other. A support bar is inserted into the adjoining ends of the two rails to align them, the bar being fixed to one of the rails and allowed to slide in and out of the other.

The novel features of the invention are set forth with particularity in the appended claims. The invention will best be understood from the following description when read in conjunction with the accompanying drawings.

BRIEF DESCRIPTION OF THE DRAWINGS

FIG. 3 is an isometric exploded view of the joint of FIG. 2;

FIG. 4 is a side elevation view of the joint of FIG. 2;

FIG. 5 is a plan view of the joint of FIG. 2;

FIG. 6 is a bottom elevation view of the joint of FIG. 2;

FIG. 7 is a sectional end view taken on the line 7—7 of FIG. 4;

FIG. 8 is a top sectional view taken on the line 8—8 of FIG. 7;

FIG. 9 is a front elevation view of an expansion joint for an electrical rail of the system of FIG. 1;

FIG. 10 is a plan view of the expansion joint of FIG. 9;

FIG. 11 is a sectional view taken on the line 11—11 of FIG. 10;

FIG. 12 is a front elevation view of an expansion joint for an electrical power rail constructed in accordance with another embodiment of the invention;

FIG. 13 is a plan view of the expansion joint of FIG. 12;

FIG. 14 is a rear elevation view of the expansion joint of FIG. 12; and

FIG. 15 is a sectional view taken on the line 15—15 of FIG. 13.

DESCRIPTION OF THE PREFERRED EMBODIMENTS

Figure 1:
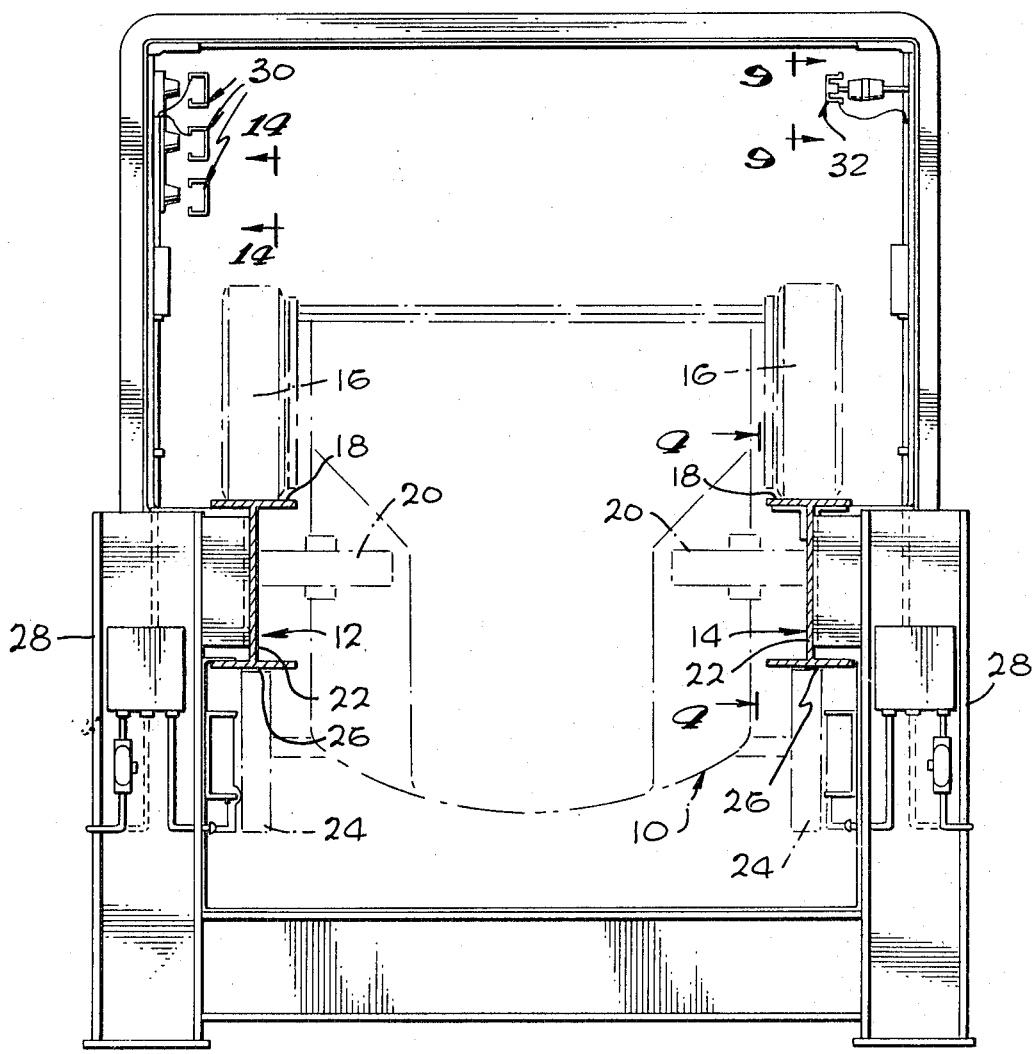
FIG. 1 is an end elevation view of a transportation system utilizing the track expansion joints of the present invention.
Figure 2:
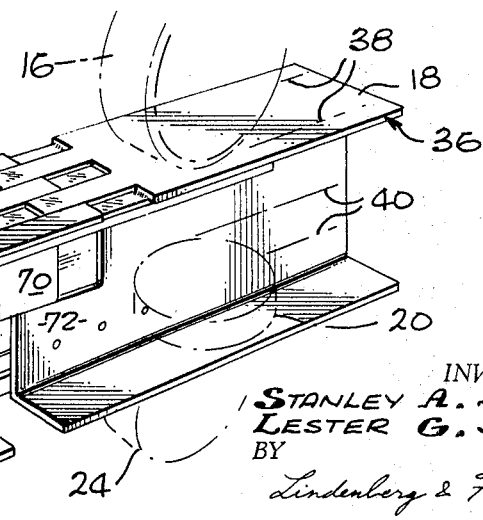
FIG. 2 is an isometric view of a main track expansion joint.

FIG. 1 illustrates a transportation system which utilizes the expansion joints of the present invention. The transportation system can be used in a variety of applications to carry goods or passengers. It utilizes vehicles 10 which are supported on a pair of tracks 12, 14, of I-beam cross section. The vehicle includes traction wheels 16 which roll along the upper flange 18 of the track, lateral guide wheels 20 which roll along the web 22, and idler wheels 24 which roll along the bottom flange 26 under certain conditions. The track is supported at spaced locations by columns 28, each column being joined to the outside face of the web. In addition to the main track, the system includes three power tracks 30 and a signal track 32, which are contacted by shoes (not shown) mounted on the vehicles. The shoes for contacting the power and signal rails generally are in sliding contact with the large faces of the tracks.

The track system may be subjected to a wide range of temperatures, necessitating provisions for absorbing the resulting contractions and expansions. A large track system generally requires large numbers of such expansion joints, and therefore it is desirable to provide joints which are as inexpensive as possible. The joints must, however, enable smooth, high speed travel of the vehicle along the track.

FIGS. 2 through 8 illustrate an expansion joint for connecting two track sections 34 and 36 which are part of the main vehicle track of I-beam cross section. The track carries the traction wheel 16 that engages the upper flange along a path indicated at 38. The guide wheel 20 engages the web along the path indicated at 40, while the idler wheels 24 can engage the bottom flange along another path which is centered under the web of the I-beam.

In order to provide a continuous path for each of the vehicle wheels, the ends of the track section are cut out complementary to each other along the vehicle path. This leaves extending portions that "fit" into the cutaway portions, the extending portions supporting part of the vehicle wheel. For example, as best shown in FIG. 3, the web 22 of the track section 34 has a bottom half which is cutaway to form an extending portion 70. The web of the other section 36 has its upper half cutaway to form an extending portion 72 that fits into the cutaway lower web area of the section 34. The cutaway portions occupy only a portion of the width of the guide wheel path 40, so the guide wheel is continuously supported as it passes between the sections. In addition to providing continuous support for the vehicle element, the joint must keep the adjacent ends of the track sections at approximately the same level, and must provide a minimum of jolt even if the track sections are slightly out of line with each other.

The track sections are generally mounted on columns that hold them above the ground, with the end of one section 36 supported on a column and the end of the connecting track section 34 supported on the first section. The section 36 must support the section 34 at the same level to prevent large jolts as the traction wheel moves from section 34 to section 36. This support must be provided without interfering with the wheels 16, 20 or 24. Such support is provided by bracing means which include a main web tying member 42. As shown in FIG. 3, the tying member 42 is of channel shape, with the base 44 of the channel lying against the outside face of the I-beam web. The base 44 is as wide as the height of the I-beam web. It carries an upper channel flange 46 and lower channel flange 48 which are disposed against the upper flange 18 and bottom flange 26 of the I-beam track 12.

The main web tying member 42 is relatively short, having a length only several times as great as the height of the I-beam track. One end is fixed to one of the track sections 36, as by welding it thereto. The other end is in sliding contact with the other track section 34. When a vehicle is on one of the track sections, the upper flange 18 of that track section presses down on the upper channel flange 46 of the tying member. The flange 46 is supported by the track section 36, which is, in turn, supported by a column located only a short distance from the track section end.

In addition to vertical alignment, the track sections must be laterally aligned so that their webs provide a smooth path for the guide wheels. This is accomplished by the provision of a secondary tying member 50 which is of L cross section. Like the main tying member, the secondary member 50 has one end welded to the track section 36 while the other end projects into the other track section 34. The secondary tying member has one leg 52 disposed against the webs of the I-beams. Accordingly, the webs of the track sections are held between the main and secondary tying members 42 and 50, and their lateral positions are closely fixed with respect to each other. The secondary tying member has another leg 54 which is disposed against the upper flanges of the track sections, to help support section 34 on the other section 36. The two tying members thus serve as means for bracing the track sections to keep them aligned.

While the main tying member 42 helps to maintain the connecting track sections at substantially the same level, there will generally exist some difference in level as the vehicle passes over the joint. While it is desirable to make the paths of all three wheels 16, 20, and 24 as smooth as possible, it is especially important to assure that the traction wheel 16 has a smooth path. The traction wheel 16 carries the load of the vehicle, and jolts to these wheels generally will have the greatest deleterious effect on performance.

In order to provide a continuous path for the traction wheel, the upper flange of both track sections have cutaway portions that lie along only part of the width of the traction wheel path 40. Instead of a simple cutaway, the ends of the upper flanges are formed with several fingers that interlock. This is to reduce the jolt resulting from small differences in level in the track sections at the upper flange. One track section 34 has two slots 56 and 58 in its upper flange. The slots form three fingers 60, 62, and 64, one in the center of the flange over the web and the other two on either side thereof. The other track section 36 has three slots or cutaway portions, which form two fingers 66 and 68 located on either side of the web. The fingers 66 and 68 are formed so that they fit into the slots 56 and 58 in the other track section.

The five fingers of the track sections are supported on the upper channel flange 46 and the leg 54 of the two tying members 42 and 50. Therefore, under heavy loading, the fingers are all pressed down so that they are at the same level. This results in the traction wheel of the vehicle experiencing a minimum jolt. One of the fingers 62 is partially supported by an extended web portion 70 of the track section 34, and it might appear that the web portion 70 can readily rest on an extended web portion 72 of track section 36. However, a slight vertical separation is provided between the bottom of web portion 70 and the top of web portion 72. Accordingly, the finger 62 always bears against the tying members 42 and 50, to assure a smooth path for the traction wheels. Under heavy loading on section 34, some weight also may be transferred by web portion 70 bearing on web portion 72.

The use of several fingers on the upper flange helps to assure that the traction wheel does not fall into a "hole." For example, if one half of the upper flange area were completely devoid of a flange portion at the joint (just as one half of the web is a void at the joint), and if the traction wheel wandered off the middle of the traction wheel path, then the traction wheel would fall into this void and cause a very large jolt. However, the provision of a finger on either side of the track for both track sections assures good traction wheel support even if it wanders to one side.

In order to reduce the shock on the guide wheels which run along the web 22 of the I-beam, the track sections 34 and 36 are provided with complementary cutaway sections which leave the extending web portions 70 and 72, as described above. The two webs portions fit into each other to provide continuous support for the guide wheels. The horizontal gap between the two extending web portions 70 and 72 lies approximately at the center of the path taken by the guide wheels 20 that roll along the web. This assures that at least half of the width of the guide wheel is always supported. As described above, the webs are maintained in alignment with each other by reason of the two web tying members 42 and 50, which lies on either side of the web.

In order to provide a continuous path for the idler wheels 24 which can roll along the center of the bottom flange 26 of the I-beams, corresponding cut out portions are formed in the bottom flanges of adjacent track sections. The bottom flange 26 of the track section 34 has a cut out portion extending from one side of the flange to just past the web of the flange, leaving an extending flange portion 74. Correspondingly, the other track section 36 has a cutaway portion leaving an extending flange portion 76. In a manner similar to that described for the lateral guide wheels, the idler wheels are provided with a path along the bottom flange, which supports almost half of the width of the idler wheels. The idler wheels are substantially wider than the web of the flange, so that even when moving over the flange portion 74, almost half of the idler wheel width is supported.

In order to facilitate assembly of the track, a bolting assembly 78 is provided. The bolting assembly includes a slot 80 in the main tying member 42, a spacer plate 82 which lies in the slot, and a cover plate 84 that lies over the slot and spacer plate. A series of bolts 86 extend through the plates 82 and 84 and are threadably engaged with holes in the web of track section 36. The bolts 86 are tightened after the extending portion 70 of track section 34 is inserted between the tying members 42 and 50. This keeps the portion 70 pressed firmly between tying members, although it can slide back and forth.

The signal track 32, shown in FIG. 1, which carries control signals to the vehicle, also must be provided with expension joints. FIGS. 9, 10 and 11 illustrate an expansion joint for connecting two main signal track sections 100 and 102, the joint being shown in a fully expanded configuration. The signal track supports a shoe 116 carried by the vehicle, to conduct signal currents to the vehicle. The main signal track sections have ends 104 and 106 which are bridged by a long joint track assembly 108. The joint assembly comprises two joint track sections 110 and 112, which are coupled to each other by a bracing bar 114 that is inserted in them. The joint assembly enables the vehicle shoe 116 to move along the face 118 of the signal track with a minimum of jarring at the track joint.

The main signal track sections 100 and 102 and the joint sections 110 and 112, are constructed of beams with the same cross ection. As shown in FIG. 11, the beams have a base 120, and upper and lower flanges 122 and 124. The base 120 of the joint sections 110 and 112 have ends which are cut in a zigzag fashion. The joint section 110 has three lateral cuts at 126, 128 and 130 that form a short extending portion 132 and a long narrow extending portion 134. The other section 112 has three similar lateral cuts 135, 136 and 137 so that the two sections are complementary and mate with each other. The joints can contract from the fully expanded configuration illustrated in the figures, until the lateral cut 130 is below the lateral cut 136 in the section 112, without causing excessive jolting of the shoe 116. The use of three lateral cuts in each joint track section assures that the shoe 116 is always in contact with at least two-thirds of the track face. This prevents a high resistance between the shoe and tracks which would lower the received signal strength, or in the case of power rails, would lead to hot spots or arcing.

The bracing bar 114 disposed within the joint sections has ends 138 and 140, so that it extends a substantial distance past the last cuts 126 and 137 on the joint sections. The bar is fixed to only the joint section 112, and is free to slide in and out of the other joint section 110. The joint sections 110 and 112 are fixed to the main track sections 100 and 102 by clamping plates 142 and 143. The clamping plates 142 and 143 lie in back of the flanges 122 and 124 on the track. A series of eight bolts 146 through 153 extend through holes in the clamping plates to retainer portions 123 within the track, to hold the clamping plates to the track. The bolts are tightened by means of nuts 145. Two of the bolts 150 and 151 extend through holes in the bracing bar. In order to assure that control signals will be conducted from one track section to the other, a cable 144 is provided which connects bolts 149 and 150 of the two clamping plates 142 and 143. The electrical signals pass from the cable to the clamping plates, and from thence to the main track and joint section.

FIGS. 12, 13, 14, and 15 show the details of a power track 30, which carries currents through a shoe 238 to energize motors in the vehicle. Two main power track sections 200 and 202 are connected together by an expansion joint assembly 204 which is shown in a maximum expansion configuration. The joint comprises a pair of joint track sections 206 and 208 that are coupled in series with each other and with the main track sections. The main track sections and joint track sections have a cross section shown in FIG. 15. The channel section includes a base 210 with upper and lower flanges 212 and 214 and inwardly directed lips 216 and 218. A bracing bar 220 with ends 222 and 224 is disposed within the joint sections to align them.

The joint section 206 has three lateral cuts 226, 228 and 230 that provide a zigzag end. This zigzag end corresponds to a similar zigzag end formed by three lateral cuts 232, 234, and 236 in the other joint section 208. As the shoe 238 passes across the joint, it transfers from one joint section to the other in three stages, thereby minimizing shock. When thermal expansion or contraction of the power track system occurs, the joint ends 206 and 208 may move apart or together. However, the shoe is always supported by at least two-thirds of its width.

The power track joint includes a pair of clamping plates assemblies 240 and 242 which hold the main track sections to the joint sections, and which fix the position of one end of the bracing bar 220. The clamping plate assembly 240 comprises a pair of plate halves 244 and 246 which are held to each other and to the bracing bar 220 by four bolts 248. When the bolts are tightened, the lips at the rear of the main track section 200 and joint section 206 are squeezed between the clamping plate 244 and the bracing bar 220, so all of these are held tightly together. At the other main track section 202, the bracing bar end 224 stops short of the clamping plate assembly 242. Accordingly, as the joint expands, the bracing bar end 224 moves away from the main track section 202.

The other clamping plate assembly 242 has two plates 250 and 252 which are held together and to the main track and joint sections 202 and 208 by bolts 254. An auxiliary bracing bar 256 extends within the joint and main track sections to help support them on each other. The bolts 254 are joined to the auxiliary bracing bar and the clamping plate assembly 242 in the same manner as the other clamping plate assembly described above. A pair of electrical cables 255 and 257 extends between the two clamping plate assemblies 240 and 242 to provide a low resistance path for electrical currents between the two main track sections and joint sections. The cables become slack during expansion of the power rail.

Thus, the invention provides expansion joints for the vehicle supporting tracks, and the signal and power tracks of the transportation system. The joints enable large expansion, yet assure that a minimum of shock is transmitted to either the wheels that support and direct the vehicles or the shoes for carrying currents to the vehicle. In addition, the joints provide a large contact area between the shoe and current-carrying tracks, for all track portions.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. An expansion joint for an I-beam track which is engaged by a vehicle element which moves along the upper surface of the top flange, comprising:
   a first I-beam track section having upper and lower flanges and a narrow web extending between them, said track section having an end portion with an elongated slot in said upper flange which is wider than said web and which is located over said web, to form fingers on either side of said slot;
   a second I-beam track section having upper and lower flanges and a narrow web extending between them, said track section having an end portion with a pair of slots in said upper flange on either side of said web to receive said fingers of said first track section and to form a finger over said web which can be received in said slot of said first track section; and
   a pair of elongated tying members disposed on opposite sides of said webs, directly beneath the flanges of said track sections to support said fingers, each of said tying members fixed to one of said track sections and in sliding engagement with the other track section.

2. The expansion joint described in claim 1 wherein:
a portion of the web in said first track section immediately below the slot therein is cut away, leaving a protruding bottom web portion; and
a bottom portion of said web of said second track section is cut away to receive said protruding portion of said first track section.

3. The expansion joint described in claim 1 wherein:
at least one of said tying members is of channel cross-section, with a base portion against the webs of said track sections and with upper and lower flanges against the upper and lower flanges, respectively, of said track sections.

4. The expansion joint described in claim 1 wherein:
said pair of slots in said second track section are spaced from the edges of said upper flange to form at least three fingers in said flange;
said first track section has a pair of slots on either side of said slot which is over said web, to receive all of said fingers of said second track section; and
said tying members are disposed under at least part of all of said fingers to support them.

5. An expansion joint for a track which defines a path for an electrical brush comprising:
   a first track section with a base portion and flanges extending from either side of said base portion to the rear of said base portion, said base portion having at least three substantially laterally extending cuts spaced along the length of said track section forming a stepped end thereof;
   a second track section with a base portion and flanges extending to the rear from either side of said base portion, said base portion having at least three substantially laterally extending cuts corresponding to said cuts in said first track section; and
   an enlongated bracing member extending between said track sections, said member having one end portion fixed to one of said track sections and an opposite end portion in sliding contact with the other track section.

6. The joint described in claim 5 wherein:
each of said track sections has a substantially straight base portion and substantially parallel upper and lower flanges; and
said bracing member has a substantially rectangular cross-section, with a height substantially equal to the distance between said upper and lower flanges of said track sections, and said bracing member is disposed between said upper and lower flanges, whereby to enable each track section to support the other.

References Cited
UNITED STATES PATENTS

| | | | |
|---|---|---|---|
| 921,533 | 5/1909 | Flynn | 238—138 |
| 1,079,825 | 11/1913 | Bamber | 238—231 |
| 1,167,174 | 1/1916 | Hester | 238—231 |
| 1,555,361 | 9/1925 | Evers | 238—231 |
| 2,193,262 | 3/1940 | Wisenor | 238—231 |
| 2,444,954 | 7/1948 | Rademaker | 238—231 |
| 2,643,063 | 6/1953 | Ross | 238—231 |

ARTHUR L. LA POINT, Primary Examiner

R. A. BERTSCH, Assistant Examiner

U.S. Cl. X.R.
238—175, 230